United States Patent [19]

Steinbrenner

[11] 4,245,911
[45] Jan. 20, 1981

[54] ECONOMICAL FAST SCAN SPECTROMETER

[75] Inventor: Ernest W. Steinbrenner, Lancaster, Calif.

[73] Assignee: The United States of America as represented by the Secretary of the Air Force, Washington, D.C.

[21] Appl. No.: 14,519

[22] Filed: Feb. 23, 1979

[51] Int. Cl.³ .............................. G01J 3/06; G01J 3/18
[52] U.S. Cl. ...................................... 356/328; 356/334
[58] Field of Search ........ 356/308, 309, 328, 332–334; 350/162 R

[56] References Cited

U.S. PATENT DOCUMENTS

| Re. 26053 | 7/1966 | Cary | 356/334 X |
| 3,090,863 | 5/1963 | McPherson | 356/334 X |
| 3,414,356 | 12/1968 | Cary | 356/334 |
| 3,433,557 | 3/1969 | McPherson | 356/334 X |
| 3,490,848 | 1/1970 | McPherson | 356/328 X |
| 3,627,427 | 12/1971 | Johnson et al. | 350/162 R X |
| 3,822,941 | 7/1974 | Roche et al. | 350/162 R X |
| 4,003,657 | 1/1977 | Sovicka | 356/334 |
| 4,081,673 | 3/1978 | Swindell et al. | 350/162 SF X |

*Primary Examiner*—F. L. Evans
*Attorney, Agent, or Firm*—Donald J. Singer; Arsen Tashjian

[57] ABSTRACT

A slow scan, frequency limited spectrometer having a screw mechanism for driving a rotatable grating is improved by incorporating and interlinking the following new constituent members with the screw mechanism: a cylindrical cam member with a groove and a constraint to attain a predetermined pitch, so that rapid scanning of a preselected wavelength range is achieved with the grating; a high torque, variable speed, direct current electric motor, so that the rapid scanning may be varied in speed; and, a liner potentiometer with a sliding contact, so that a remote wavelength readout of the variable rapid scanning can be obtained. Cylinder cam members of various pitches are also disclosed for use in scanning different wavelength ranges. At a low cost for improvements, the resulting spectrometer provides a variable fast scan, and is frequency selective.

9 Claims, 11 Drawing Figures

ECONOMICAL FAST SCAN SPECTROMETER

STATEMENT OF GOVERNMENT INTEREST

The invention described herein may be manufactured and used by or for the Government for governmental purposes without the payment of any royalty thereon.

BACKGROUND OF THE INVENTION

This invention relates to improvements in spectroscopy and, more particularly, to the improvement at low cost of a slow scan, frequency limited spectrometer to a variable fast scan, frequency selective spectrometer.

Scanning spectrometers, such as monochromators, in the visible and infrared frequencies (and wavelengths) may be differentiated by the time necessary to make a complete spectral scan. Conventional (diffraction) grating instruments require times on the order of minutes to scan through an appreciable range (e.g., 200 to 500 nm). Very rapid scanning can be obtained by using a rotating mirror or other device with a conventional instrument. However, this can be done only over a limited wavelength interval (i.e., generally less than 10 nm). At the other end of the time (and cost) scale are the very fast scanning instruments which have become available in the last few years: optical multichannel spectrometers, and circular variable filter spectrometers. These devices are capable of scan times of less than 100 m sec. Unfortunately, their price places them out of reach for many applications.

Therefore, there exists in the art a need for a low cost variable fast scan, frequency selective (i.e., ultraviolet, visible, and infrared spectrum) spectrometer.

I have fulfilled this need by improving, at minimum cost, a low priced, slow scan, frequency limited spectrometer; and, thereby, I have significantly advanced the state-of-the-art.

SUMMARY OF THE INVENTION

The principal object of this invention is to provide, at minimum cost, a variable fast scan, frequency selective spectrometer by improving a low priced, slow scan, frequency limited spectrometer.

This principal object, as well as other related objects, of this invention will become readily apparent after a consideration of the description of the invention, together with reference to the Figures of the drawings.

DESCRIPTION OF THE IMPROVEMENTS

As to the Prior Art

Figure 1:
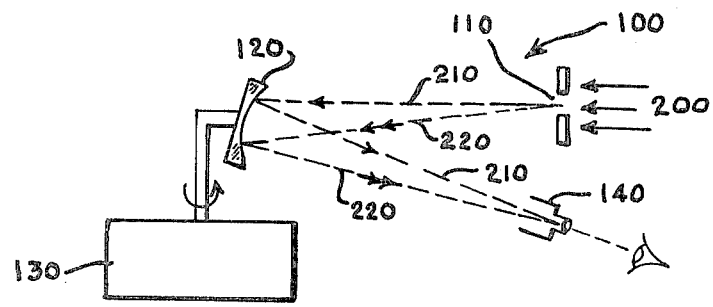
FIG. 1 is a side elevation view, in simplified schematic form, of a typical slow scan, frequency limited spectrometer.

With reference to FIG. 1, therein is shown in a highly simplified schematic form, a typical diffraction grating spectrometer 100 that is assumed, for the sake of discussion, to be of the slow scan, frequency limited type which, it is to be noted, is low priced. The spectrometer 100 includes: an optical slit 110 impinged upon by light 200 of the wavelength (or frequency) to be diffracted; a rotatable diffraction grating 120; a screw mechanism 130 for driving the grating 120 for scanning; and, an eyepiece 140 (or plate-holder, or the like).

Figure 2:
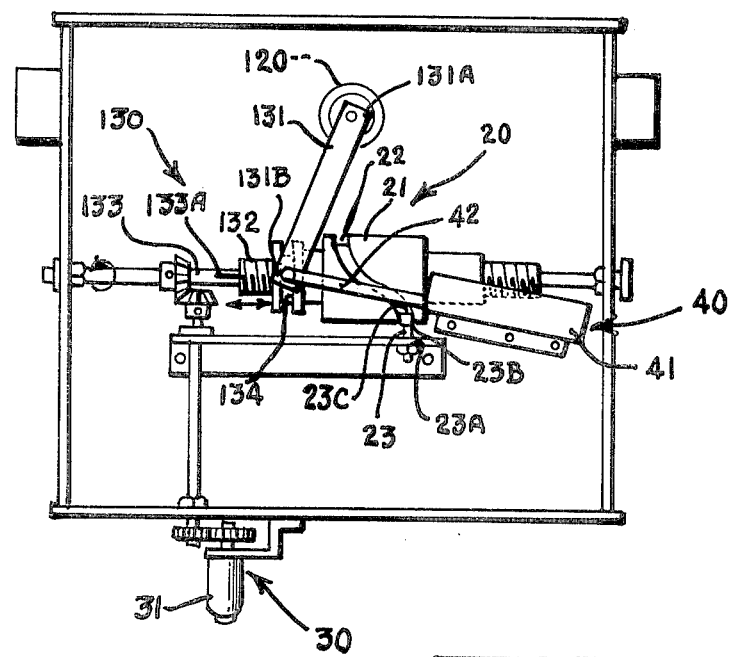
FIG. 2 is a bottom view, in simplified form, partially schematic and partially pictorial, of the driving screw mechanism of the grating of the spectrometer shown in FIG. 1, incorporating my improvements thereto.

With reference to FIG. 2, therein are shown not only my improvements (generally designated 20, 30 and 40) to the driving screw mechanism 130, FIG. 1, but also those components of the mechanism 130, that are to be used in coacting relationship with my improvements.

It is here to be noted that the typical spectrometer 100 chosen to be improved, as a matter of illustration and not of limitation, is a readily commercially available Spex Industries Model 1670, 0.22 mm monochromator. In the off-the-shelf stock form, scanning is accomplished with this spectromater by rotating the grating 120, FIG. 1, using an arm 131, FIG. 2, driven by a fine thread drive screw 132 that is keyed to, and is slidably movable along, revolving shaft 133. The lateral motion (i.e., the longitudinal motion) of the drive screw 132 moves the grating drive arm 131, as the screw 132 rotates against a fixed, threaded, nylon block (not shown). The maximum scan rate of this prior art mechanism 130 is 50 nm/minute.

As to my Improvements

My improvements to this typical prior art spectrometer grating drive mechanism 130 are shown in FIGS. 2, 3A, 3B, 4A, 4B, 5A and 5B, and in their most basic and generic form comprise:

a. a means 20, FIG. 2, linked to the second end 131B of the grating drive arm 131, for rapidly scanning a preselected wavelength range with the rotatable grating 120, FIGS. 1 and 2, which is linked to the first end 131A of grating drive arm 131; and b. means 30, FIG. 2, linked to the second end 131 B of the grating drive arm, for varying in speed (i.e., varying the speed) of the rapid scanning; and c. means 40, FIG. 2, linked to the second end 131B of the grating drive arm 131, for providing a remote wavelength readout resulting from the variable rapid scanning.

More specifically, the means 20 for rapid scanning includes: a rotatable, hollow, cylindrical cam member 21, FIGS. 2, 3A, 3B, 4A, 4B, 5A and 5B, that is operatively connected to the screw mechanism 130 (and, more particularly, to screw 132, FIG. 2), with the cam member 21 having a groove 22, FIGS. 2, 3A, 3B, 4A, 4B, 5A and 5B, that is positioned, shaped, and dimensioned to attain a predetermined pitch (i.e., a linear displacement, or "rise", or the like); and, a constraining element 23, FIG. 2, having a fixedly prositioned first end 23A, FIG. 2, and a ball bearing guide 23C at the second end 23B, with the ball bearing guide 23 at the second end 23B disposed in, and in contact with, the groove 22. As matter of preference, and not of limitation, the cylindrical cam member 21 is made of aluminum, has a diameter of 1.812 inches, and has a length of 1.50 inches. The groove 22 preferably is 0.376 of one inch wide and 0.188 of one inch deep.

Also, more specifically, the means 30 for varying the speed of the rapid scanning includes a high torque variable speed, direct current electric motor 31, FIG. 2. As a matter of preference, and not of limitation, the motor 31 is used at 24 volts direct current. It is to be noted that use at this voltage results in the cylindrical cam member 21 rotating at 90 revolutions per minute; and, as a consequence the rotatable grating 120, FIGS. 1 and 2, makes 180 scans per minute.

Further, more specifically, the means 40 for providing a remote wavelength readout resulting from the variable rapid scanning with and by the grating 120 includes a linear potentiometer 41 with a sliding contact 42 that is connected to the second end 131B of the grating drive arm 131.

Figure 3A:
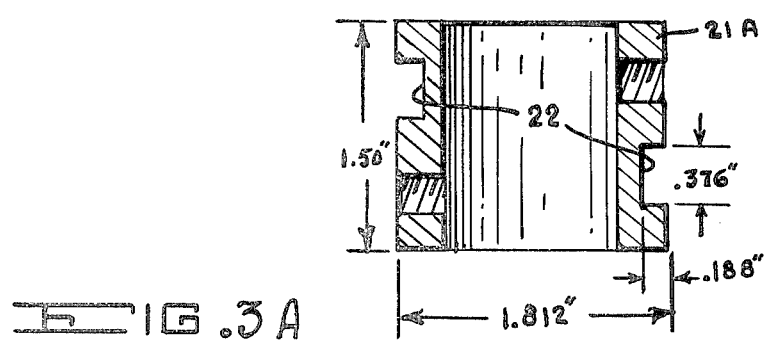
FIGS. 3A, 4A and 5A are side elevation views, in simplified schematic cross sectional form, of, respectively, the cylindrical cam members shown in FIGS. 3A, 4A and 5A.
Figure 3B:
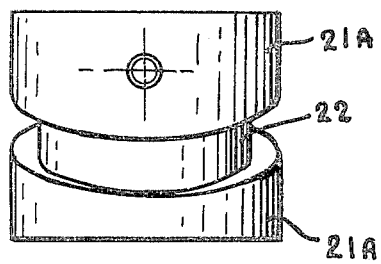
FIGS. 3B, 4B and 5B are pictoral representations, in perspective and in simplified form, of three variations of the preferred embodiment of my inventive cylindrical cam member constituent that is incorporated in the driving screw mechanism shown in FIG. 2.
Figure 3C:
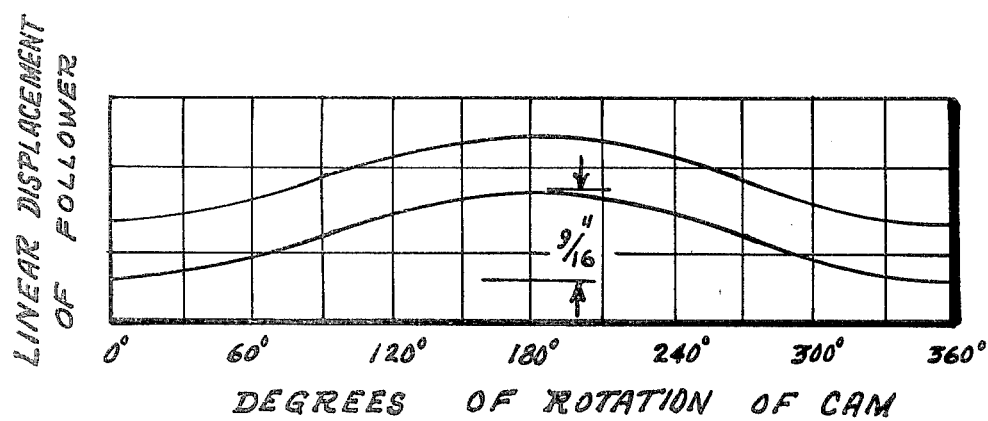
FIGS. 3C, 4C and 5C are charts showing the pitch (i.e., the displacement) caused by, respectively, the cylindrical cam members shown in FIGS. 3A and 3B, FIGS. 4A and 4B, and FIGS. 5A and 5B.
Figure 4A:
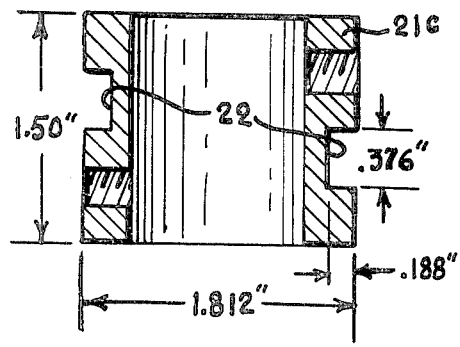
Figure 4B:
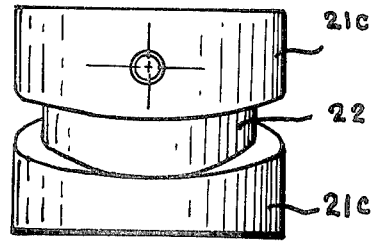
Figure 4C:
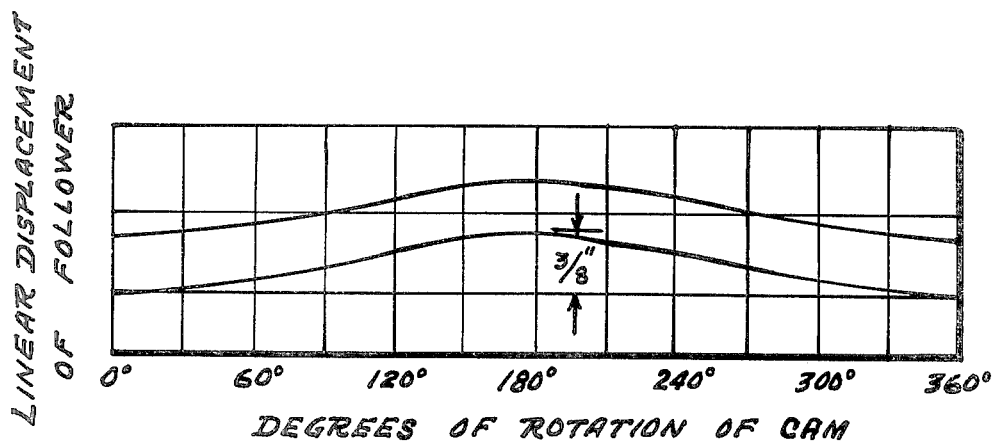
Figure 5A:
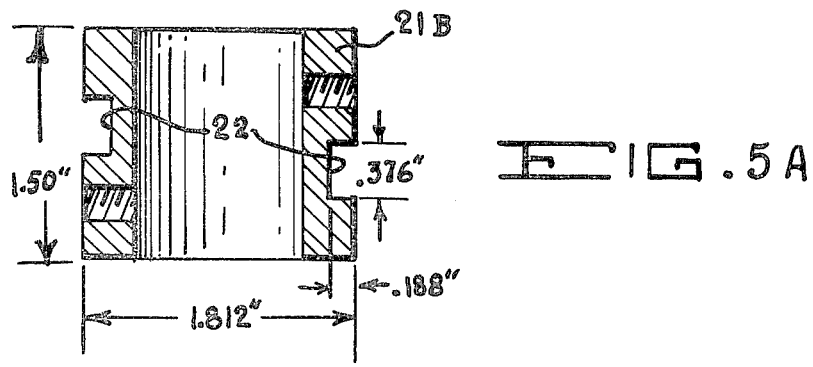
Figure 5B:
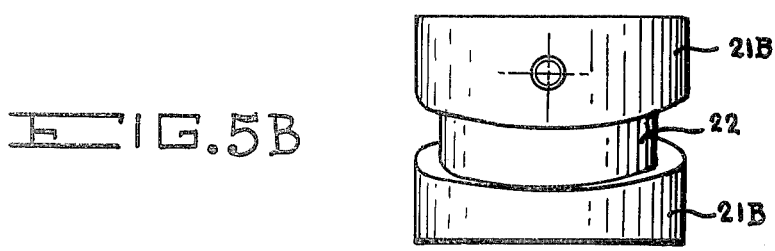
Figure 5C:
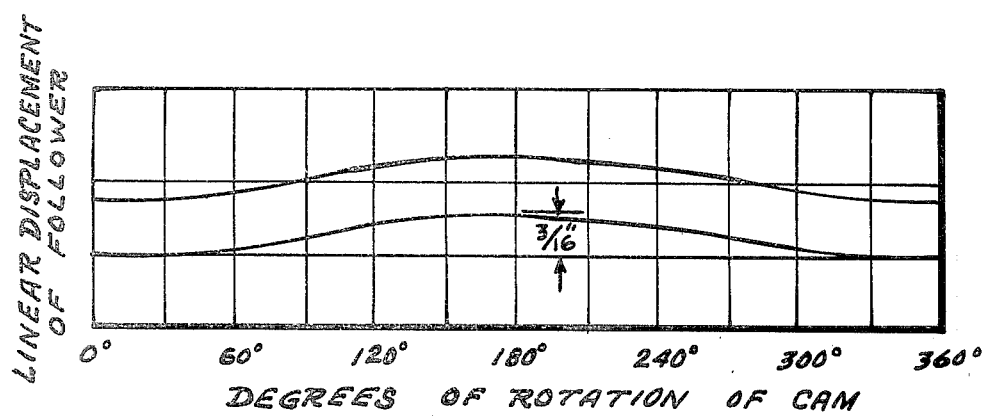

Now, with reference to FIGS. 3A and 3B, FIGS. 4A and 4B, and FIGS. 5A and 5B, therein are shown three variations 21A, 21B, and 21C, respectively of representative cylindrical cam member 21, FIG. 2. These variations 21A, 21B, and 21C are used in scanning for wavelengths (and frequencies) in the ultraviolet, visible, and infrared portions of the spectrum. The respective pitches (i.e., the liner displacement, or "rise", caused) of the variations are: 9/16 of one inch for variation 21A, as shown in FIG. 3C; ⅜ of one inch for variation 21B, as shown in FIG. 4C; and, 3/16 of one inch for variation 21C, as shown in FIG. 5C.

MANNER OF OPERATION OF THE IMPROVED SPECTROMETER

The manner of operation of my improvements, of the improved diffraction grating drive screw mechanism, and of the improved spectrometer can be ascertained very easily by a person of ordinary skill in the art from the foregoing description, together with reference to the Figures of the drawings.

For others, the following explanation is made:

As a preliminary matter, it is to be noted that the prior art drive screw mechanism 130, FIGS. 1 and 2, has a fixed, threaded nylon block (not shown), and a stock 110 volts alternating current electric motor (not shown), which I have removed from the mechanism 130. It is also to be noted that the components which I have added to this altered drive screw mechanism are not the mechanical or engineering equivalents of those components that I have removed. Stated another way, it is to be remembered that the prior art spectrometer with its original drive screw mechanism is a slow scan, frequency limited one; whereas, the prior art spectrometer with the drive screw mechanism significantly improved by me is a variable fast scan, frequency selective spectrometer which is vastly superior to, and yet is of equally low cost as, the prior art spectrometer.

Now, with reference to the operation of the improved spectrometer (as shown in FIG. 2), prior to the use of the spectrometer, the appropriate one of the three cylindrical cam members (i.e. 21A, FIGS. 3A and 3B, or 21B, FIGS. 4A and 4B, or 21C, FIGS. 5A and 5B), which is representatively designated 21 inFIG. 2, is slipped over and is connected to the drive screw 132, and is positioned so that the ball bearing guide 23C at the second end 23B of the constraining element 23 fits into the groove 22 of the representative cylindrical cam member 21. Then, the high torque, variable speed electric motor 31 is turned on. The motor 31 causes the shaft 133 to revolve; and, the keyed thread screw 132 moves laterally (i.e., longitudinally) a predetermined linear distance along and in the key slot 133A of shaft 133, in accordance with the structural nature of the groove 22, as the cylindrical cam member 21 also rotates. This lateral movement of the screw thread 132 causes the second end 131B of the grating drive arm 131 to move upwardly (i.e., "rise") along the groove 134, taking forwardly with it the sliding contact 42 of the linear potentiometer 41. As the cylindrical cam member 21 continues to rotate, the lateral movement of the screw thread 132 is in the opposite direction, and the second end of the grating drive arm 131B moves downwardly in the groove 134, thereby moving the sliding contact 42 backwardly. Each complete evolution (i.e., 360 degrees) of the cylindrical cam member 21 causes a repetition of this cycle, until the motor 31 is turned off; and, during the "up-down" movement of the grating drive arm 131, the grating rotates and scans, and the wavelength scanned may be "readout" at a remote point or location.

CONCLUSION

It is abundantly clear from all of the foregoing, and from the contents of the FIGS. of the drawings, that the stated principal object, as well as other related objects, of my improvement invention have been attained.

It is to be noted that, although there have been described the fundamental and unique features of my invention as applied to a particular situation, other embodiments, adaptations, substitutions, additions, omissions, and the like may occur to, and can be made by, those of ordinary skill in the art, without departing from the spirit of my invention.

What is claimed is:

1. In a slow scan, frequency limited spectrometer having a rotatable diffraction grating and a screw mechanism for driving said rotatable grating, wherein said screw mechanism includes a grating drive arm with a first end and a second end, and wherein said first end of said grating drive arm is linked to said rotatable grating, the improvements comprising:
    a. means, linked to said second end of said grating drive arm, for rapidly scanning a preselected wavelength range with said rotatable grating that is linked to said first end of said grating drive arm, wherein said means for rapidly scanning a preselected wavelength range with said rotatable grating includes:
        (1) a rotatable hollow cylindrical cam member operatively connected to said screw mechanism for driving said rotatable grating, with said cylindrical cam member having a groove positioned, shaped, and dimensioned to attain a predetermined pitch, whereby rapid scanning of said preselected wavelength range with said rotatable grating is achieved;
        (2) and, a constraining element having a fixedly positioned first end and a ball bearing guide second end, with said ball bearing guide second end disposed in, and in contact with, said groove in said cylindrical cam member, whereby said second end functions to constrain said cylindrical cam member;
    b. means, linked to said grating drive arm, for varying in speed said rapid scanning with said rotatable grating;

c. and, means linked to said second end of said grating drive arm, for providing a remote wavelength readout resulting from said variable rapid scanning with said rotatable grating;

whereby said spectrometer is now useable as a variable fast scan, and frequency selective, spectrometer.

2. The improvements, as set forth in claim 1, wherein said means for varying in speed said rapid scanning with said rotatable grating includes a high torque, variable speed, direct current electric motor.

3. The improvements, as set forth in claim 2, wherein said means for providing a remote wavelength readout resulting from said variable rapid scanning with said rotatable grating includes a linear potentiometer with a sliding contact connected to said second end of said grating drive arm.

4. The improvements, as set forth in claim 3, wherein said rotatable, hollow, cylindrical cam member is made of aluminum.

5. The improvements, as set forth in claim 4, wherein said high torque, variable speed, direct current electric motor is used at 24 volts direct current, thereby said cylindrical cam member rotates at 90 revolutions per minute and said rotatable grating makes 180 scans per minute.

6. The improvements, as set forth in claim 5, wherein said attainable predetermined pitch is 9/16 of one inch.

7. The improvements, as set forth in claim 5, wherein said attainable predetermined pitch is $\frac{3}{8}$ of one inch.

8. The improvements, as set forth in claim 5, wherein said attainable predetermined pitch is 3/16 of one inch.

9. The improvements, as set forth in claim 5, wherein said cylindrical cam member is in the form of a right circular cylinder having a diameter of 1.812 inches and a length of 1.50 inches, and said groove in said cylindrical cam member is 0.376 of one inch wide and 0.188 of one inch deep.

* * * * *